United States Patent
Berger et al.

(10) Patent No.: US 6,669,598 B2
(45) Date of Patent: Dec. 30, 2003

(54) LINE PRESSURE CONTROL FOR A CONTINUOUSLY VARIABLE TRANSMISSION

(75) Inventors: Todd Roy Berger, Saline, MI (US); Steven Patrick Moorman, Dexter, MI (US); Brian W. Whitmarsh, Belleville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/078,136

(22) Filed: Feb. 19, 2002

(65) Prior Publication Data

US 2003/0158009 A1 Aug. 21, 2003

(51) Int. Cl.[7] .............................................. B60K 41/12
(52) U.S. Cl. ...................................................... 477/45
(58) Field of Search ........................... 477/45, 163, 48; 475/210; 474/28

(56) References Cited

U.S. PATENT DOCUMENTS

| | | | | | |
|---|---|---|---|---|---|
| 4,967,621 | A | * | 11/1990 | Soga et al. .................... | 477/45 |
| 5,042,328 | A | * | 8/1991 | Morishige et al. ............ | 477/45 |
| 5,203,233 | A | * | 4/1993 | Hattori et al. ................. | 477/45 |
| 5,993,338 | A | * | 11/1999 | Kato et al. ..................... | 474/12 |
| 6,019,700 | A | * | 2/2000 | Imai et al. ..................... | 477/45 |

* cited by examiner

*Primary Examiner*—Dirk Wright
(74) *Attorney, Agent, or Firm*—Leslie C. Hodges

(57) ABSTRACT

An electro-hydraulic control for a continuously variable transmission includes a first regulator valve which is controlled to provide a high pressure output to control the ratio within the continuously variable transmission and a second regulator valve which is controlled to provide an engagement pressure for torque transmitting mechanisms within the transmission. The control incorporates multiplexing of the valve components, creates prioritization of fluid flow, detection of priority mode of operation, over-pressurization protection valves, and ensures a minimum of fluid flow to the torque transmitting mechanisms and the oil cooler.

2 Claims, 4 Drawing Sheets

LINE PRESSURE CONTROL FOR A CONTINUOUSLY VARIABLE TRANSMISSION

TECHNICAL FIELD

This invention relates to transmission controls and, more particularly, to electro-hydraulic controls for a continuously variable transmission.

BACKGROUND OF THE INVENTION

Continuously variable transmissions include a continuously variable unit (CVU), such as a belt and pulley mechanism, and a gearing mechanism, such as a planetary gear arrangement. The gearing mechanism is conventionally controlled by torque transmitting mechanisms (i.e., clutches or brakes) that are selectively operated by hydraulic fluid. The continuously variable unit requires a high pressure to ensure sufficient clamping forces for the belt and pulley mechanism. The effective ratio of the CVU is determined by the radius at which the belt engages the pulleys. In most instances, the ratio can be varied from an underdrive to an overdrive.

The amount of clamping pressure required is a function of the input torque to the transmission and the ratio at which the variable transmission unit is operating. If the clamping pressure is low, there is a possibility of belt slippage, and even a small amount of belt slippage can be detrimental to the CVU. The ratio of the CVU is changed by reducing or increasing the pressure acting on one of the sheave halves of one of the pulleys, generally the input pulley, while the pressure at the other pulley is maintained substantially constant. If the control pressure is excessive at either pulley, there is an efficiency loss within the transmission and possible damage to or overstressing of the components of the CVU.

The control pressure level required to engage the torque transmitting mechanisms is generally lower than the pressure required to control the CVU. The amount of pressure required is essentially a function of torque being transmitted and size of the conventional clutch hardware, consisting of a movable piston and a clutch pack. If the control pressure is below the required value, slippage of the friction plates can occur, which will shorten the life of the torque transmitting mechanisms.

The hydraulic circuit generally includes a pressure regulating valve that must be capable of regulating the correct clamping pressure and the correct torque transmitting engagement pressure to avoid a shortened life for either the variable transmission unit or the torque transmitting unit.

The pressure within the circuit is generated by a positive displacement pump. The amount of pressure that the pump can generate is a function of the pump speed, flow demand of the transmission, and leakage within the circuits. The more flow the transmission requires, the lower the line pressure that can be generated. Generally, two regulator valves are employed, one for the CVU control and one for the torque transmitting mechanisms. The valves are usually disposed in flow relation such that the CVU line pressure circuit has priority. All of the hydraulic fluid not used by the CVU control is passed to the regulator valve for the gearing section controls. Thus, the regulator valve for the gearing section controls must be sized to accommodate large amounts of fluid flow at times during the operation of the transmission, particularly during ratio changes when the pressure at the control pulley is being reduced. This means that the flow priority is set in such a way that if the pump is not able to supply the requested line pressure for the CVU, part of the transmission flow demand is reduced through the regulator valve in order to achieve the desired line pressure.

For example, in order to preserve the required line pressure to the sheaves in a belt and pulley type transmission, the line pressure regulator valve may reduce the flow to the oil cooler. The oil flowing to the sheave is said to have the higher priority than the oil going to the oil cooler. Generally, this sacrifice of flow to one part of the transmission in order to maintain the pressure in another part of the transmission should happen only during extreme or transient conditions, such as the development of a large leak or a rapid ratio change within the transmission.

SUMMARY OF THE INVENTION

It is an object of this invention to provide an improved hydraulic control system for a continuously variable transmission.

In one aspect of the invention, the hydraulic control system regulates the line pressure to the CVU pulleys, clutches, solenoids and torque converter of a continuously variable transmission.

In another aspect of the present invention, separate regulator valves provide a first line pressure and a second line pressure to thereby minimize oil flow demand and improve the transient shift performance and fuel economy.

In yet another aspect of the present invention, excess pump flow is only directed to the pressure regulator controlling the first line pressure which enables the remaining valves within the control system to be reduced in size and weight.

In still another aspect of the present invention, the hydraulic control system prioritizes the pressure in the first line pressure above all other pressure demands and directs this line pressure to the sheaves of the continuously variable transmission.

In still another aspect of the present invention, the hydraulic control system minimizes the effects of transient flow demands and the pressure output of the solenoid controls by prioritizing the first line pressure above all other pressure demands.

In a further aspect of the present invention, the control system minimizes slippage within the torque transmitting mechanisms by prioritizing second line pressure flow to the clutches above cooler flow demands.

The present invention employs a single variable bleed solenoid (VBS) valve which controls both the first line pressure regulator valve and the second line pressure regulator valve. The use of a single variable bleed solenoid to perform this function reduces the cost of the transmission control. The hydraulic system has an actuator feed limit valve which protects the variable bleed solenoid valve from over pressurization. A second line pressure feed limit valve is incorporated within the control to limit both the torque transmitting mechanisms and the torque converter from over pressurization by limiting the output of the second line pressure regulator valve prior to distribution of fluid to either of these devices.

BRIEF DESCRIPTION OF THE DRAWINGS

FIG. 1 is a block diagram showing the arrangement of FIGS. 1A, 1B and 1C.

DESCRIPTION OF THE PREFERRED EMBODIMENT

Figure 1A:
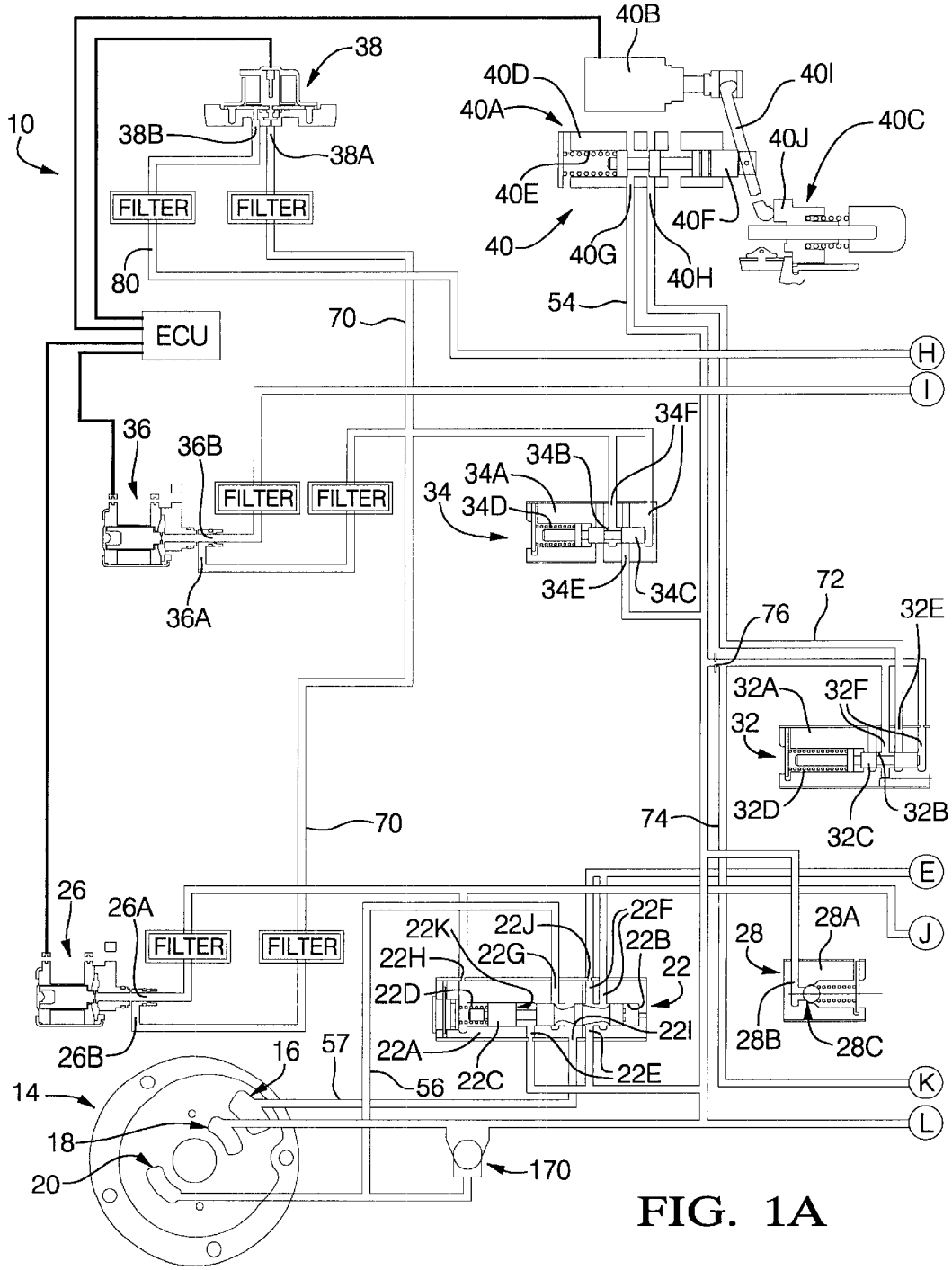
FIGS. 1A and 1B are a schematic representation of a hydraulic control system.
Figure 1B:
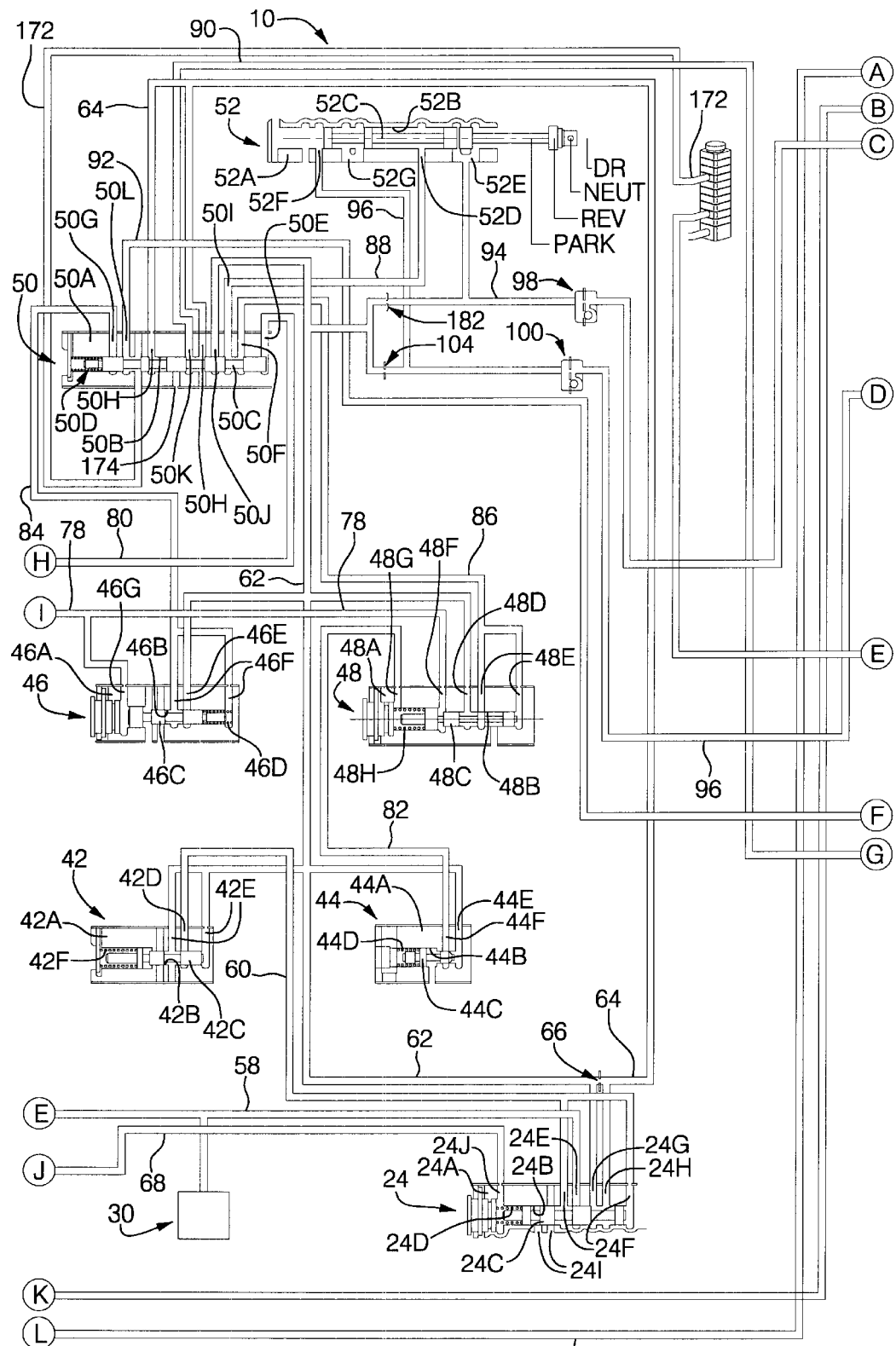
Figure 1C:
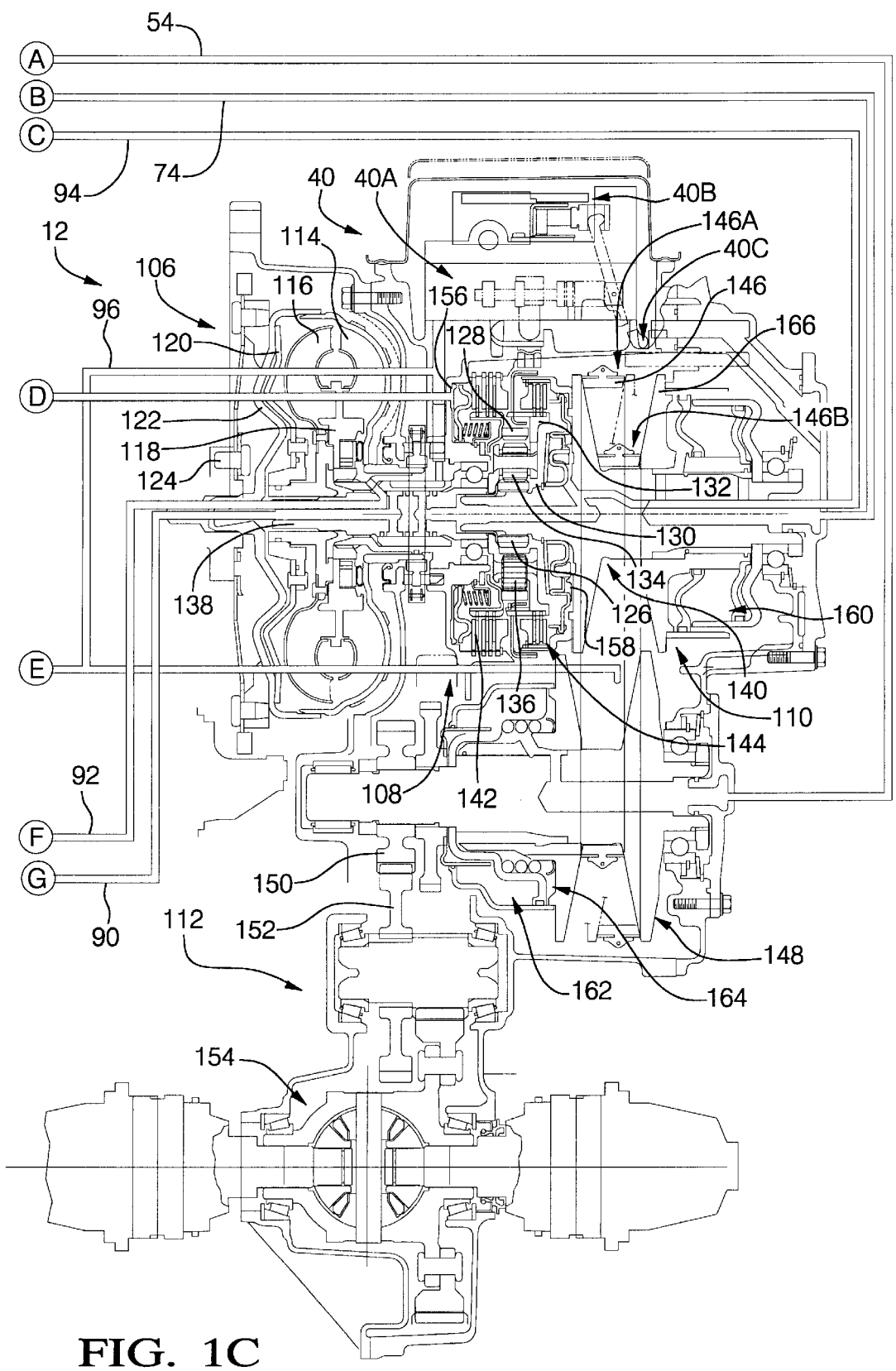
FIG. 1C is a cross-sectional elevational view of a continuously variable transmission utilizing the control system of FIGS. 1A and 1B.

A control system 10 is shown in FIGS. 1A and 1B and a continuously variable transmission 12 is shown in FIG. 1C. The control system 10 includes a binary pump 14 which has an inlet or suction port 16 and two outlet ports 18 and 20. Port 18 is the primary pump output port and port 20 is a secondary output pump port. These ports 18 and 20 can have different pressures during the operation of the control system 10. The control system 10 further includes a primary pressure regulator valve 22, a secondary regulator valve 24, a variable bleed solenoid (VBS) 26, a primary overpressure regulator valve 28, a pressure transducer 30, a primary feed limit valve 32, an actuator feed limit valve 34, a variable bleed solenoid (VBS) 36, an on/off solenoid 38, a ratio control mechanism 40, a secondary line pressure limit valve 42, a clutch boost valve 44, a torque converter clutch regulator apply valve 46, a clutch control valve 48, a torque converter clutch enable valve 50 and a manual control valve 52.

The pressure regulator valve 22 includes a valve body portion 22A having found therein a valve bore portion 22B. A valve spool 22C is slidably disposed in the valve bore 22B and is urged rightward by a control spring 22D. The valve body portion 22A includes a pair of line pressure ports 22E, a pair of tier two feed ports 22F, a second line pressure port 22G, a variable bleed solenoid (VBS) signal port 22H, and a suction or exhaust port 22I. The ports 22E are continually connected with the output port 18 of the pump 14 through a primary or first line pressure passage 54. The port 22G is continually connected with the output port 20 of the pump 14 through a secondary pressure passage 56. The port 22I is continually connected with a suction or inlet line 57 that is continually connected with the inlet port 16 of the pump 14.

The secondary regulator valve 24 includes a valve body portion 24A in which is formed a valve bore 24B. A spool valve 24C is slidably disposed with the valve bore 24B and is urged rightward as seen in FIG. 1B by a control spring 24D. Valve body 24A has an inlet port 24E which is in continuous communication with the port 22F of the valve 22 through a feed passage 58.

The valve body 24A also has formed therein a pair of second line pressure passages 24F that are in continuous communication with a second line pressure passage 60. The valve body 24A further includes a second line limit port 24G which is in continuous communication with a second line limit passage 62, and a limited converter feed port 24H which is in communication with a limited converter feed passage 64. The limited converter feed passage 64 is also in communication with the passage 62 through a restriction or orifice 66.

The valve body 24A includes a variable bleed signal port 24J that is in continuous communication with a variable bleed signal line 68 that is also connected with the port 22H of the valve 22 and with a signal port 26A of the variable bleed solenoid valve 26.

The variable bleed solenoid valve 26 also has an inlet port 26B that is in communication with an actuator feed limit passage 70. The variable bleed solenoid 26, the variable bleed solenoid 36, and the on/off solenoid valve 38 are conventional solenoid valves that are well known in the art of hydraulic control mechanisms.

The overpressure regulator valve 28 includes a valve body portion 28A, an inlet port 28B and a ball check assembly 28C. The ball check assembly 28C is set to open the passage 54 which is connected to port 28B to exhaust when the pressure in the passage 54 exceeds a maximum predetermined value. The function of the valve therefore is to limit the maximum pressure that can be achieved in passage 54.

The pressure transducer 30 is a conventional electrohydraulic device that is actuated by the pressure in passage 58 and puts out an electrical signal relative to that pressure level. The pressure transducer 30, the variable bleed solenoid valve 26, the variable bleed solenoid valve 36, the on/off solenoid valve 38, and the ratio control mechanism 40 are all in electrical communication with a conventional electrical control unit (ECU), not shown, which may include, as is well known, a programmable digital computer that distributes electrical signals to these mechanisms in accordance with commands given by the electrical control unit in response to sensor signals received from both the transmission 12 and the pressure transducer 30.

The primary limit valve 32 includes a valve body portion 32A having formed therein a valve bore 32B in which a valve spool 32C is slidably disposed. The valve spool 32C is urged rightward, as seen in FIG. 1A, by a control spring 32D. The valve body portion 32A includes a primary feed port 32E connected with a primary feed passage 72 and a pair of primary feed limit ports 32F that are in communication with a primary limit feed passage 74. The primary feed limit passage 74 also communicates with the first line pressure passage 54 through an orifice or restriction 76.

The actuator feed limit valve 34 includes a valve body portion 34A in which is formed a valve bore 34B that has slidably disposed therein a spool valve 34C. The spool valve 34C is urged rightward, as viewed in FIG. 1A, in the valve bore 34B by a control spring 34D. The valve body portion 34A has an inlet port 34E that is in fluid communication with the first line pressure passage 54 and a pair of actuator limit feed passages 34F that are in fluid communication with the actuator feed limit passage 70. The actuator feed limit valve is operable to provide a controlled pressure to the variable bleed solenoid 26, the variable bleed solenoid 36, and the on/off solenoid 38.

The variable bleed solenoid 36 has an inlet port 36A which is in fluid communication with the actuator feed limit passage 70 and an outlet port 36B that is in fluid communication with a variable bleed signal passage (VBS) 78. The VBS signal passage 78 provides a variable control signal generated at the variable bleed solenoid 36.

The on/off solenoid valve 38 has an inlet port 38A and an outlet port 38B. The inlet port 38A is in fluid communication with the actuator feed limit passage 70. The output port 38B is in fluid communication with a TCC enable signal passage 80.

The ratio control mechanism 40 includes a hydraulic valve 40A, a conventional stepper motor 40B and a sheave follower 40C. The valve 40A includes a valve body 40D that has formed therein a valve bore 40E in which is slidably disposed a valve spool 40F. The valve body 40D includes an inlet port 40G that is in fluid communication with the line pressure passage 54 and an outlet port 40H that is in communication with the primary feed passage 72.

The stepper motor 40B has connected therewith a lever arm 40I which is pinned with the valve spool 40F and slidably engages a cam follower 40J which is a portion of the sheave follower 40C. The cam follower 40J engages a sheave 166 which is a component of an input pulley 140.

The limit valve 42 includes a valve body portion 42A that has formed therein a valve bore 42B in which is slidably disposed a valve spool 42C. The valve body 42A has an inlet port 42D that is in fluid communication with the second line pressure passage 60 and a pair of outlet ports 42E that are in fluid communication with the second line limit passage 62. The function of the line limit valve 42 is to limit the pressure in passage 62 to a level determined by the area of the valve spool 42C and the force in a control spring 42F. Whenever the pressure in passage 60 is below this value the valve spool 42C will permit unrestricted flow between the passages 60 and 62.

The clutch boost valve 44 includes a valve body portion 44A that has formed therein a valve bore 44B in which is slidably disposed a valve spool 44C. The valve spool 44C is urged rightward in the valve bore 44B by a control spring 44D. The valve body 44A has an inlet port 44E and an outlet port 44F. The inlet port 44E is in communication with the passage 62 and the output port 44F is in fluid communication with a clutch boost passage 82.

The torque converter clutch regulator apply valve 46 includes a valve body portion 46A that has formed therein a valve bore 46B in which is slidably disposed a valve spool 46C. The valve spool 46C is urged leftward, as seen in FIG. 1B, by a control spring 46D. The valve body 46A has an inlet port 46E that is in fluid communication with the passage 62, a pair of outlet ports 46F that are in fluid communication with a regulated apply passage 84, and a variable bleed solenoid signal port 46G that is in fluid communication with the VBS signal passage 78.

The clutch control valve 48 includes a valve body portion 48A having formed therein a valve bore 48B in which is slidably disposed a valve spool 48C. The valve body portion 48A has formed therein an inlet port 48D that is in fluid communication with passage 62, a pair of outlet ports 48E that are in fluid communication with a clutch control passage 86, a first signal port 48F that is in communication with the VBS signal passage 78 and a second signal port 48G that is in communication with the clutch boost passage 82. A control spring 48H urges the valve spool 48C rightward in the valve bore 48B, as seen in FIG. 1B. The valve spool 48C is also urged rightward by fluid pressure in the clutch boost passage 82 and is urged leftward by control pressure in the VBS signal passage 78 and by pressure at the outlet ports 48E which act on the end of the valve spool 48C. Thus, the pressure in the clutch control passage 86 is a function of clutch boost pressure in passage 82, variable bleed solenoid signal pressure in passage 78 and the outlet pressure of the clutch control valve 48.

The torque converter clutch enable valve 50 includes a valve body portion 50A in which is formed a valve bore 50B that has a valve spool 50C slidably disposed therein. The valve spool 50C is urged rightward in the valve bore 50B by a control spring 50D. The valve spool 50C is urged leftward by pressure in the passage 80 which is admitted to the right end of valve spool 50C through a control port 50E. The valve body 50A has a clutch control inlet port 50F, a regulated apply port 50G, a pair of converter feed ports 50H, a limited clutch control feed port 50I, a second line limit port 50J, a torque converter release outlet port 50K, and a torque converter apply outlet port 50L. The port 5OF is in fluid communication with the clutch control passage 86, the port 50G is in fluid communication with the regulated apply passage 84, the ports 50H are in fluid communication with the converter feed passage 64, the port 50I is in fluid communication with the clutch feed passage 88, the port 50J is in fluid communication with a second line limit passage 62, the port 50K is in fluid communication with a torque converter release passage 90, and the port 50L is in fluid communication with a torque converter apply passage 92.

The manual control valve 52 includes a valve body portion 52A that has a valve bore 52B in which is slidably disposed a spool valve 52C. The spool valve 52C is preferably connected with a conventional manual shift control mechanism which will move the valve spool valve 52C linearly within the valve bore 52B. The valve bore 52B includes an inlet port 52D which is in fluid communication with the clutch feed passage 88, a drive port 52E which is in fluid communication with a drive passage 94 and a reverse port 52F which is in fluid communication with a reverse passage 96. When the valve spool 52C is moved to the reverse position, fluid pressure delivered through the passage 88 will flow through a bypass port 52G to thereby permit communication of fluid from the inlet port 52D to the reverse port 52F and the passage 96. A plurality of exhaust ports are also present which will exhaust the reverse passage during neutral, drive and park and will exhaust the drive passage at the end valve spool 52C during neutral, reverse or park.

The drive passage 94 has disposed therein a ball check and orifice apparatus 98 which is a conventional timing device which will permit rapid apply and controlled flow release. The reverse passage 96 has a similar timing mechanism 100 for the reverse clutch apply and release. The drive passage 94 is in fluid communication with the second line limit passage 62 through a restriction 182, and the reverse passage is in fluid communication with the second line limit passage 62 through a restriction 104. This will ensure that the clutches are pre-filled with fluid at their normal engagement speeds.

The transmission 12 includes a torque converter 106, a planetary gear arrangement 108, a continuously variable unit (CVU) 110 and a final drive mechanism 112. The torque converter 106 is a conventional hydrodynamic device having an engine driven impeller 114, a fluid driven turbine 116 and a stator 118.

A torque converter clutch 120 is disposed between the turbine 116 and an input shell 122. The input shell 122 is drivingly connected between an engine 124 and the impeller 114 in a conventional manner. The planetary gear arrangement 108 includes a sun gear 126, a ring gear 128 and a planet carrier assembly 130. The planet carrier assembly 130 includes a carrier member 132 and a plurality of meshing pinions 134 and 136 meshing with the sun gear 126 and ring gear 128, respectively.

The carrier member 132 is driven by a shaft 138 that is drivingly connected with the turbine 116 and the torque converter clutch 120. The sun gear 126 is drivingly connected with the input pulley 140 of the CVU 110. The ring gear 128 is operatively connected with a torque transmitting mechanism or brake 142 which, when applied, will hold the ring gear 128 stationary. The carrier 132 and the sun gear 126 are operatively interconnected by a torque transmitting mechanism or clutch 144 which, when applied, will secure the ring gear member 128 and the planet carrier assembly member 130 of the planetary gear arrangement 108 together such that the planetary system will rotate as a single unit.

The input pulley 140 is connected through a friction belt assembly 146 with an output pulley 148. The output pulley 148 is connected through a pair of transfer gears 150 and 152 with a conventional final drive differential 154 that is a component of the final drive mechanism 112.

The brake 142 has an apply cavity 156 that is in fluid communication with the reverse passage 96 and the clutch 144 has an apply cavity 158 that is in fluid communication with the passage 94. Thus, the forward and reverse clutch and brake are controlled in their engagement by the valve 50 and the manual valve 52. The torque converter clutch enable valve 50 is operative to supply clutch control pressure in passage 86 to the clutch feed passage 88 when the valve is in the spring set position shown, and from the second line limit passage 62 to the clutch feed passage 88 when the valve spool 50C is in the pressure set position as a result of a pressure signal in the port 50E.

The sheave 166 of the pulley 140 has a dual chamber piston 160 that receives fluid pressure through the passage 74. The pressure in the dual chamber piston 160 controls the force with which the sheave halves are held against the belt 146. The output pulley 148 has a control piston 162 that includes a chamber 164 that is in fluid communication with the passage 54. Therefore, fluid pressure in the passage 54 provides the force to hold the sheave halves of pulley 148 against the belt 146.

The belt 146 is shown in two positions in FIG. 1C. In the position where the portion 146A of the belt 146 is at the extreme outboard end or diameter of the input pulley 140 is the overdrive position, and in the position where the portion 146B of the belt 146 is at the extreme inner diameter of the input pulley 140 is the maximum underdrive condition. During transmission operation in forward or reverse, the pressure is applied to the control piston 160 to urge the belt 146 from the position 146B toward the position 146A. As the belt is moved outward on the input pulley, it is moved inward on the output pulley, thereby decreasing the speed of the input pulley relative to the output speed of the transmission 12.

The pressure at the chamber 164 is determined by the primary pressure regulator valve 22 as a result of the VBS signal in passage 68. The pressure at the piston 160 and passage 74 is determined by the ratio control mechanism 40 and is limited in its maximum amount by the primary feed limit valve 32. The ratio control mechanism 40 has an output pressure that is proportional to the input request of the stepper motor 40B and the position of the sheave follower 40C.

As seen in FIG. 1C, the ratio control mechanism 40 is disposed on the transmission and the sheave follower 40C is actuated by the sheave halve 166 of the input pulley 140. As the stepper motor 40B requests a ratio change, the valve 40A will affect the primary feed pressure in passage 72 accordingly, thereby changing the pressure in piston 160, such that the sheave 166 will be moved in one direction or the other depending on the pressure change and the sheave follower 40C will move the lever control 401 to return the valve spool 40F to a position wherein the pressure in the passage 54 is metered to the primary feed passage 72 at a level that maintains the desired ratio.

The pressure regulator valve 22 operates in three modes: a primary mode, a secondary mode, and a priority mode. During the primary mode, fluid flow in pump 14 is delivered from port 18 to passage 54 where it enters through the port 22E to a differential area 22K on the valve spool 22C. The fluid pressure operating on the differential area 22K operates in opposition to the variable bleed solenoid signal in passage 68 and the force in spring 22D to move the valve spool 22C leftward, such that the passage 56 is opened through port 22G to the suction port 22I, thereby returning the fluid to the suction port 16 of the pump 14 through the passage 57. Thus, the flow from the port 20 of the pump 14 is passed directly back to suction and therefore does not create any resistance or energy absorption in the pump 14. During this operation, a portion of the inlet of the fluid in passage 54 is directed through the regulator valve 22 and out one of the ports 22F to the passage 58 where it is directed to the secondary pressure regulator valve 24.

During the secondary mode, the system pressure requirements and flow requirements are sufficiently high so that the valve spool 22C is closed to port 22G such that output flow from the port 20 will pass through a pump switching ball 170 to the passage 54 which is then utilized in the differential area 22K to counteract the VBS signal pressure at port 22H and the force in spring 22D. During this operation, a portion of the inlet of the fluid in passage 54 is directed through the regulator valve 22 out one of the ports 22F to the passage 58 where it is directed to the secondary pressure regulator valve 24.

During the priority mode of operation, the valve spool 22C is moved sufficiently to the right due to the pressure in port 22H and the force in spring 22D, such that the passage 54 is disconnected from one of the ports 22F and is passed through a restriction 22J to the passage 58 to maintain a minimum flow amount to the secondary regulatory valve 24. The overpressure relief valve 28 protects against instantaneous or momentary spikes of pressure which occur when the valve spool 22C does not respond quickly enough to affect the change in system pressure when transient conditions or shift conditions occur quickly.

The pressure regulator valve 24 controls a pressure in line 60 which provides feed oil for the torque transmitting mechanisms, the torque converter, and the oil cooler. The pressure regulator valve 24 allows the pressure in passage 60 to be maintained at a lower value than the pressure in passage 54 during most driving conditions. The lower pressure reduces leakage which increases flow available for transient maneuvers and improves the fuel economy by allowing the secondary pump port 20 to be switched out of operation at an earlier time.

The valve 24 performs two functions. It regulates the pressure in passage 60 by modulating between port 24E and exhaust 24I until the force balance is achieved between pressure in passage 60, the variable bleed solenoid signal in passage 68 and the valve spring 24D. Secondly, the valve 24 forces the limited converter passage 64 feed oil to a lower priority than the oil in passage 60. To reduce the number of components, the same variable bleed solenoid 26 is used to provide signal pressure to both valve 22 and valve 24.

Figure 2:
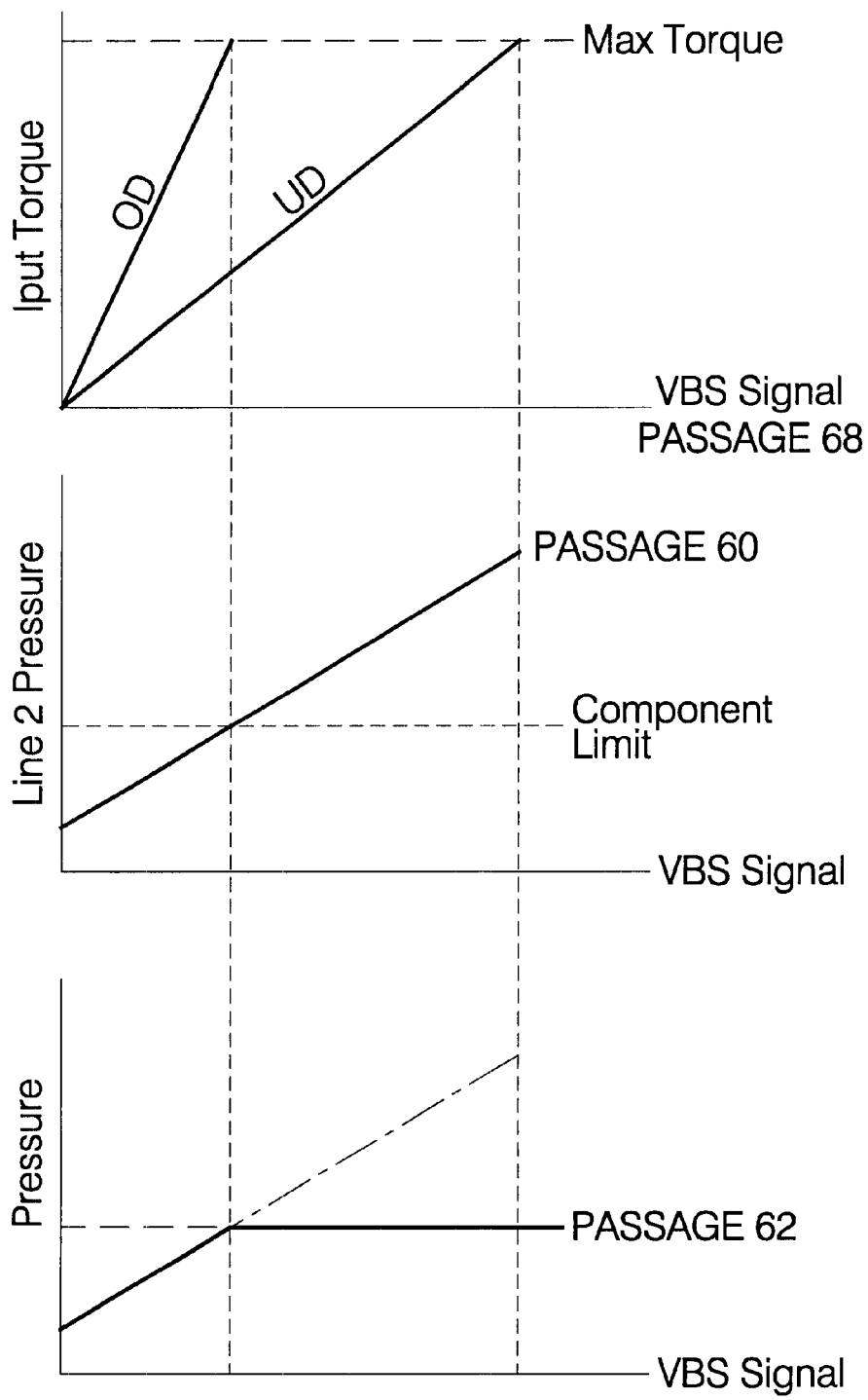
FIG. 2 is a plurality of curves showing the relation between the VBS signal pressure, system pressures and CVU input torque.

FIG. 2 shows that the variable bleed solenoid signal pressure required to provide adequate sheave torque at full overdrive ratio (OD) is less than the variable bleed signal pressure required to provide full underdrive ratio (UD). The pressure in passage 62, which operates the torque transmitting mechanisms, is not a function of ratio but merely a function of input torque. Since the same signal passage 68 is used to modulate both valve 22 and valve 24, valve 24 must reach pressure for full torque transmitting mechanism capacity at the variable bleed signal for input torque and the overdrive ratio. This means that line pressure in passage 60 continues to rise as the variable bleed solenoid signal rises above the value from maximum input torque at full overdrive ratio.

The valve 42 is positioned downstream of the regulator valve 24 to limit the maximum value of the pressure in the passage 62 to a value at or below the maximum acceptable value at the torque transmitting mechanisms and the torque converter components. This preserves the life of these units. The valve 42 modulates between ports 42D and the exhaust until the force balance is achieved between the pressure in passage 62 acting on the end of the valve 42 and the spring 42F. The resulting pressure in passage 62 is shown in FIG. 2.

The valve 24 also provides a priority function for controlling the pressure in passage 64, which is a limited converter feed oil, in order to maintain the pressure in passage 60 at an acceptable level. The pressure regulator valve 24 accomplishes this priority relationship by feeding the passage 64 with fluid from passage 62 only after the flow requirements for passage 60 have been achieved. This is provided by routing the feed path for passage 64 through the valve 24. If sufficient pressure in passage 60 cannot be generated, the spring 24D and the variable bleed solenoid pressure signal will push the valve spool 24C to the right, stopping the flow of fluid in passage 60 to exhaust. If the pressure in passage 60 is still deficient, the valve spool 24C will move further to the right until it restricts the port 24G which supplies the limited torque converter feed passage 64. The flow of fluid in the passage 64 will be reduced until the force balance is achieved or until port 24G is fully closed. The orifice 66 is provided to ensure that passage 64 is never completely closed in order to provide some cooler flow under extreme or transient operating conditions.

The valve 34 functions to feed the solenoids. These solenoids are fed with the highest priority oil, that is the oil in passage 54. Since the pressure in passage 54 is often greater than the maximum allowable at the solenoids, the valve 34 is included to limit the maximum pressure feeding solenoids to below the maximum value recommended by the manufacturer.

The line pressure transducer 30 provides two important functions. The line pressure transducer 30 is located in passage 58 between the valves 22 and 24 to perform these functions. First, the transducer 30 provides accurate feedback to the ECU regarding the actual pressure in passage 54. This allows closed loop control of pressure in passage 54 resulting in improved fuel economy due to reduced pressure safety factors. Second, the placement of the transducer 30 in the passage 58 provides an accurate diagnostic signal when the transmission is operating while prioritizing the fluid distribution from passage 60. Conditions that could cause this type of operation would include increased pump leakage or other circuit leakage. This signal could be used by the ECU to take diagnostic action, such as holding the ratio constant or increasing idle speed and other operating functions.

The clutch control valve 48 regulates the pressure in passage 86 when modulating between the port 48D and an exhaust port until a force balance is achieved against the spring 48H and the variable solenoid pressure at the port 48F.

During a shifting event or interchange, pressure in passage 86 is modulated as a function of the area ratios of the clutch regulator valve 48, the spring 48H and the pressure of the variable signal solenoid in port 48F. The area ratio is referred to as the valve gain. The area ratio referred to is the area at the end of the valve spool 48C and the differential area presented to port 48F. The larger the gain between the pressure in passage 86 and the pressure in passage 78, the larger the clutch control pressure varies relative to changes and variations in the pressure in passage 78. The variations in the pressure in passage 86 create variations in shift feel which might be unacceptable to the operator.

Conventional practice would size the clutch control valve 48 gain for maximum pressure requirements of the torque transmitting mechanism for its worse case of holding torque. Often, holding torques are much higher than shifting torques. During shifting torques, the clutch is slipping. Only while the clutch is slipping will errors in clutch pressure be manifested as unpleasant shift feel to the operator. Because of this, it is desirable to set the valve gain to be the smallest that will accomplish the shifting events. This leaves the problem of supplying additional pressure for the torque holding events.

This control system allows the gain of the clutch control valve 48 to be optimally sized for shifting events while providing boosted pressure for holding events. The boost valve 44 sends either exhaust or pressure in passage 82 to the spring end of the valve 48, depending on the level of pressure in passage 62 acting on the end of the valve 44. When the output of the valve 44 is connected with exhaust, the force balance takes place as normal and the clutch regulator pressure in passage 86 is a function of the gain of valve 48, the pressure in passage 78, and the force in spring 48H. When the output of the valve 44 is equal to the pressure in passage 62, the valve 48 is pushed to the open position and the port 48D is opened to the port 48E. The pressure in passage 86 is raised to the level of pressure in passage 62 during this event. The level of the pressure in passage 62 is independently set through the modulating controls of valve 24 to provide enough pressure for the holding event.

The valve 46 regulates a controlled pressure in passage 84 by modulating between a pressure at port 46E and an exhaust port until the force balance is achieved against the spring 46D and the pressure of the variable solenoid valve in port 46G. During torque converter clutch operation, the pressure in passage 84 is modulated as a function of the area ratio of the regulator valve 46, the spring 46D and the variable bleed solenoid pressure at port 46G. Using a variable bleed solenoid 36 instead of a standard or more conventional pulse-width-modulated solenoid provides a less noisy signal and has less variation changes in line pressure. The result is improved torque converter clutch operation.

The torque converter clutch valve 50 is a shift valve with two discreet positions: a spring set position and a pressure set position. The spring pushes the valve to its de-energized or spring set position. When the torque converter solenoid valve 38 is electrically activated, the signal in passage 80 is sent to the port 50E pushing the valve spool against the spring 50D into its energized or pressure set position. In de-energized or spring set position, the valve 50 feeds the passage 88 with pressure from passage 86. The valve 50 also feeds the passage 90 with pressure from passage 64 and connects the passage 92 with an oil cooler circuit 172. In this position, the valve also closes the port 50G. In the energized or pressure set position, the valve 50 feeds the passage 88 with pressure from passage 62, exhausts the passage 90 through an orifice 174, feeds the passage 92 with fluid in the passage 84, and connects the passage 64 with the oil cooler circuit 172.

The valve 50 can supply modulated control pressure fluid to the passage 88 from the passage 86 when the valve 50 is in the de-energized position and application of the torque transmitting mechanism is required, but the torque converter clutch is to be released. An example of this would be using the pressure in passage 88 to engage one of the torque transmitting mechanisms of the transmission to begin a vehicle launch. The pressure in passage 86 is controlled by the pressure in the passage 78 which comes from the VBS valve 36. Under such conditions, the torque converter clutch is required to be released in order to prevent stalling of the engine and to allow torque multiplication through the torque converter to improve launch performance. Since the open torque converter generates heat under such conditions, the return flow in the passage 92 is connected to the oil cooler circuit 172.

When the valve 50 is in the energized or pressure set position, the valve 50 is used to apply the torque converter clutch. Pressure in passage 84 is directed to the pressure in passage 92, which energizes the torque converter clutch. The pressure in passage 90 which is return oil from the torque converter clutch is exhausted through an orifice 174 to aid in the apply feel of the torque converter clutch. Since the solenoid valve 36 is being modulated according to the requirements of the torque converter clutch system, the pressure in passage 86 will be modulated at an incorrect level for the torque transmitting mechanism that has been engaged. For this reason, the pressure in passage 62 is connected with the passage 88. Since the torque converter heat generated is minimal when the torque converter clutch is applied, the passage 64 bypasses the torque converter and is connected directly to the oil cooler circuit 172.

Conventional practice would be to provide a separate regulator valve, control valve, on/off solenoid, and variable bleed solenoid valves for both torque transmitting mechanism control and torque converter clutch control. With the present system, these two criteria are met through the multiplexing of two systems such that a single set of valves will provide both functions. The malfunction mode protection and the modulation requirements for the two systems are very similar. The modulation modes are mutually exclusive since the torque converter clutch is not applied while the torque transmitting mechanism is being applied and vice versa. This allows the reuse of the VBS valve 36, the solenoid valve 38, and the valve 50 in order to reduce cost, manufacturing and assembly time, and also improve the overall reliability of the system.

The modulation requirements for the pressure in passages 92 and 88 are quite similar. Both require regulated pressures as a function of valve gain, spring load, and an electronically-controlled modulating pressure signal provided by the VBS valve 36. Therefore, the reuse of the valving circuit during both torque converter clutch engagement and torque transmitting mechanism engagement is available.

The loss of function mode requirements are also very similar for the pressure in the passage 92 and the pressure in passage 88. For the torque converter clutch system, it is not acceptable for a single element malfunction to occur which results in loss of converter flow to the torque converter with the torque converter clutch not applied, nor to stall the engine as a result of the torque converter clutch being applied at low vehicle speeds. The hardware required to satisfy these two requirements is an independent, electronically-controlled shift valve in series with an apply regulator valve. For the pressure in passage 88, it is not acceptable for a single element malfunction to result in a loss of ability to apply the torque transmitting mechanism. The hardware required to satisfy this requirement is an independent electronically-controlled shift valve in series with a clutch regulator valve. This protection is provided in both instances by the valves 50, 38, and 36. In addition, the line activated boost valve 44 provides independent protection.

If the electrical system should become inoperable, the valve 50 will assume the spring set position as established by the spring 50D. The clutch control pressure in the passage 86 will be maintained at a maximum value as established by the spring 48H and the bias pressure in the passage as applied at the port 48G. The valve 50 will deliver the pressurized fluid in the passage 86 to the passage 88 which is communicated with the valve 52 which in turn will distribute pressurized fluid to the torque transmitting mechanism that has been selected by the operator. The system pressures as established by the regulator valves 22 and 24 will be at a maximum value, and the ratio of the CVU 110 will remain unchanged. This will permit the operator to drive the vehicle to a repair station where the electrical function can be restored.

What is claimed is:

1. An electro-hydraulic control in a transmission having a continuously variable unit requiring a first pressure level and at least one friction device requiring a second pressure level, said electro-hydraulic control comprising:

a source of fluid pressure;

a first pressure regulator valve in fluid communication with said source of fluid pressure to limit the pressure of said source to a first predetermined level;

a second pressure regulator valve in downstream fluid flow relation with said first pressure regulator valve and having a fluid output pressure limited at a second predetermined level at a value less than said first predetermined level;

a variable pressure control valve means in fluid communication with said source and having a variable output pressure communicated with both said first and second pressure regulator valves for providing a control pressure thereto to establish said first and second predetermined levels;

said source having first and second output flow volumes and an input portion; and said first pressure regulator valve having a first position wherein an unrestricted port thereof is disposed in fluid communication with said second pressure regulator valve and said second output flow volume from said source is connected through a return port directly with said input portion of said source, a second position wherein said unrestricted port is disposed in fluid communication with said second pressure regulator and said return port is closed, and a third position wherein a restricted output port of said first regulator valve is disposed in fluid communication with said second regulator valve to supply fluid thereto and said return port is closed.

2. An electro-hydraulic control in a transmission having a continuously variable unit requiring a first pressure level and at least one friction device requiring a second pressure level, said electro-hydraulic control comprising:

a source of fluid pressure;

a first pressure regulator valve in fluid communication with said source of fluid pressure to limit the pressure of said source to a first predetermined level;

a second pressure regulator valve in downstream fluid flow relation with said first pressure regulator valve and having a fluid output pressure limited at a second predetermined level at a value less than said first predetermined level;

a variable pressure control valve means in fluid communication with said source and having a variable output pressure communicated with both said first and second pressure regulator valves for providing a control pressure thereto to establish said first and second predetermined levels; and said variable pressure solenoid valve means being electrically controlled, and said first and second pressure regulator valve each being set to establish a maximum output pressure therefrom when said variable pressure solenoid valve means is inoperable due to a discontinuance of the electrical control.

* * * * *